United States Patent [19]

Kiejzik

[11] 4,258,531
[45] Mar. 31, 1981

[54] PROCESS AND DEVICE FOR VIEWING ADJACENT MICROFILM FRAMES IN SERIES

[76] Inventor: Paul A. Kiejzik, 2907 Monterey Ct., Springfield, Pa. 19064

[21] Appl. No.: 878,008

[22] Filed: Feb. 15, 1978

Related U.S. Application Data

[60] Continuation-in-part of Ser. No. 611,004, Sep. 8, 1975, Pat. No. 4,003,187, and a continuation-in-part of Ser. No. 845,482, May 13, 1976, and Ser. No. 845,483, May 13, 1976, Pat. No. 4,173,837, each is a division of Ser. No. 611,004.

[51] Int. Cl.³ .................... B65B 63/00; B65B 43/26
[52] U.S. Cl. .................................. 53/520; 53/570
[58] Field of Search ............... 53/520, 564, 570, 574, 53/384, 479; 83/373, 589, 602

[56] References Cited

U.S. PATENT DOCUMENTS

| | | |
|---|---|---|
| 2,779,408 | 1/1957 | Miller et al. ................ 83/373 X |
| 2,937,483 | 5/1960 | Englestein .................... 53/520 |
| 3,019,579 | 2/1962 | Heckman ...................... 53/520 |
| 3,457,697 | 7/1969 | Englestein .................... 53/520 |
| 3,477,196 | 11/1969 | Lerner ....................... 53/570 X |
| 3,500,709 | 3/1970 | Landman .................... 83/589 X |
| 3,872,645 | 3/1975 | Dorman ........................ 53/520 |
| 3,896,603 | 7/1975 | Tout ............................ 53/520 |
| 4,064,677 | 12/1977 | Takahashi et al. ........... 53/520 |
| 4,099,362 | 7/1978 | Dorman ........................ 53/520 |
| 4,102,029 | 7/1978 | Thompson ................. 53/520 X |
| 4,154,046 | 5/1979 | Weber et al. .............. 53/520 X |
| 4,167,842 | 9/1979 | Dorman ........................ 53/520 |

Primary Examiner—Horace M. Culver

[57] ABSTRACT

In a preferred embodiment, a microfilm-inserter machine adapted for simultaneous viewing of separate microfilm frames adjacent before and after a strip cutting device and for severing and thereafter insertion of cut-sections of microfilm into microfilm into microfilm jackets. Thereby, by use of the machine, a person is able to speedily cut the frame sections exactly where desired by virtue of the two separate and adjacent viewers in series along the path of travel of feed of the microfilm.

2 Claims, 16 Drawing Figures

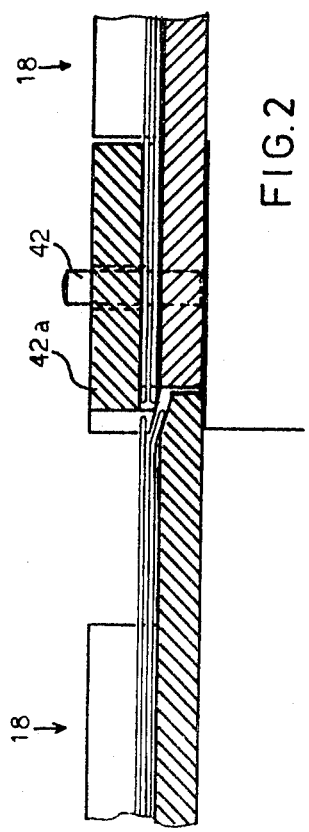
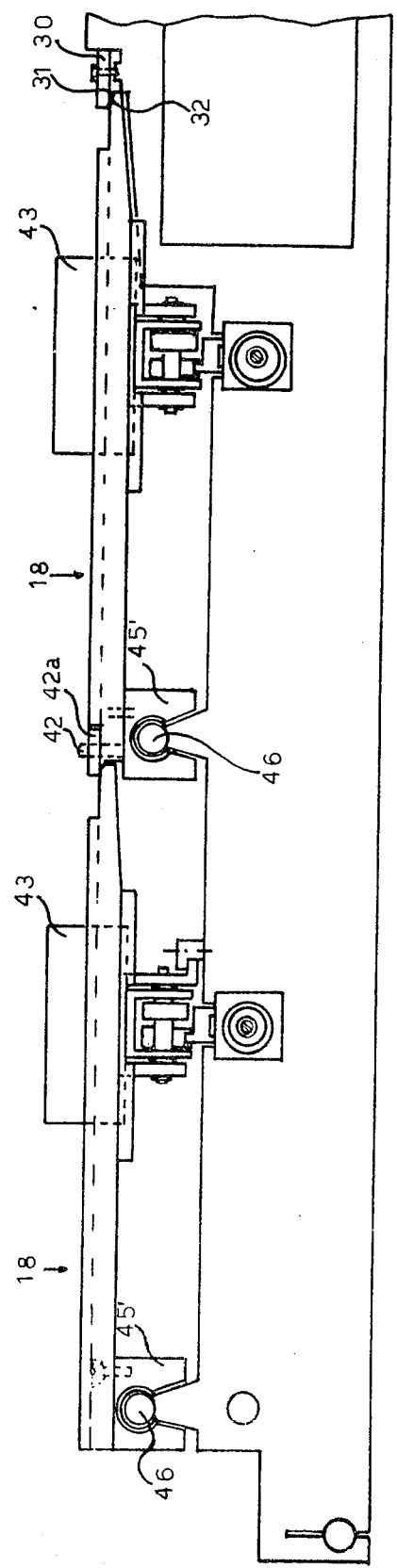
FIG. 2
FIG. 3

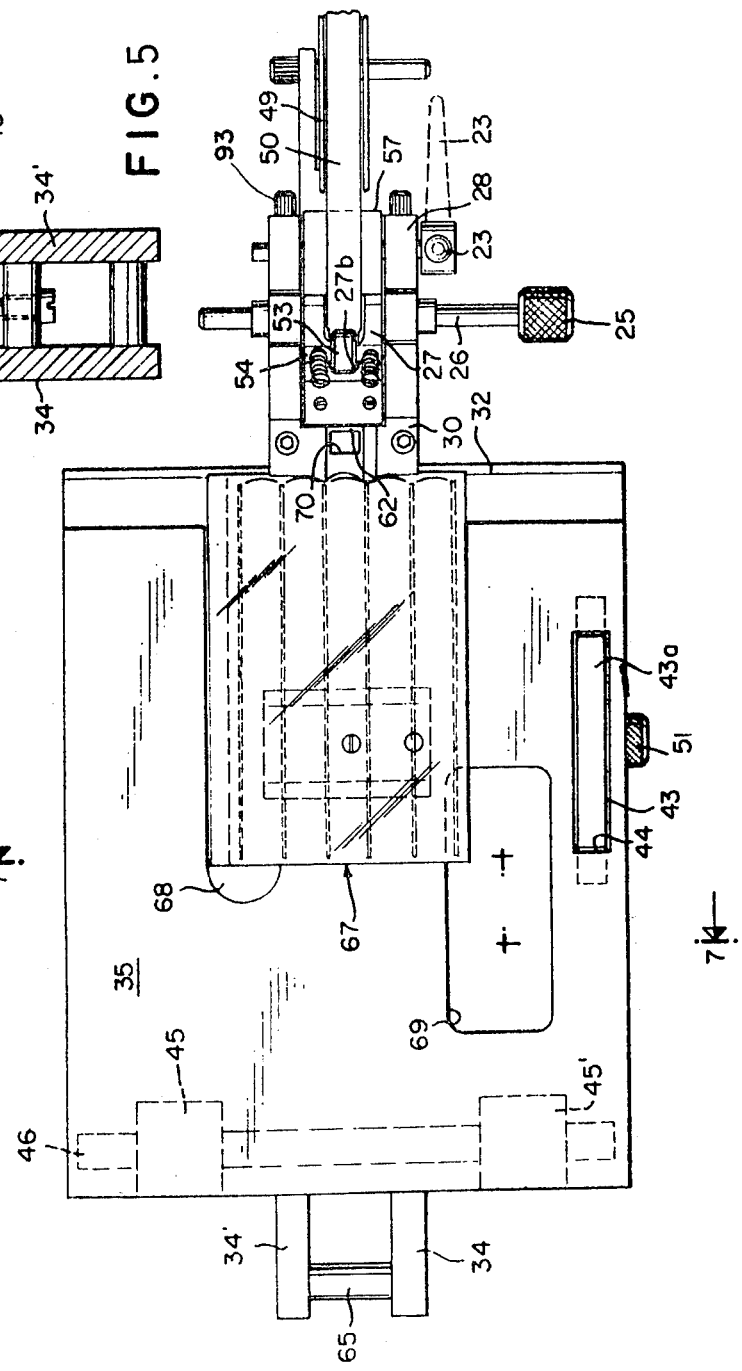

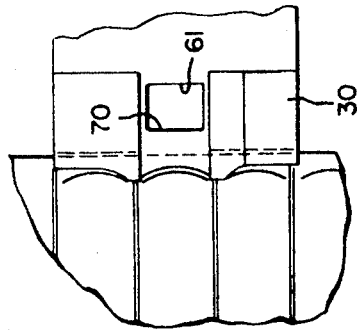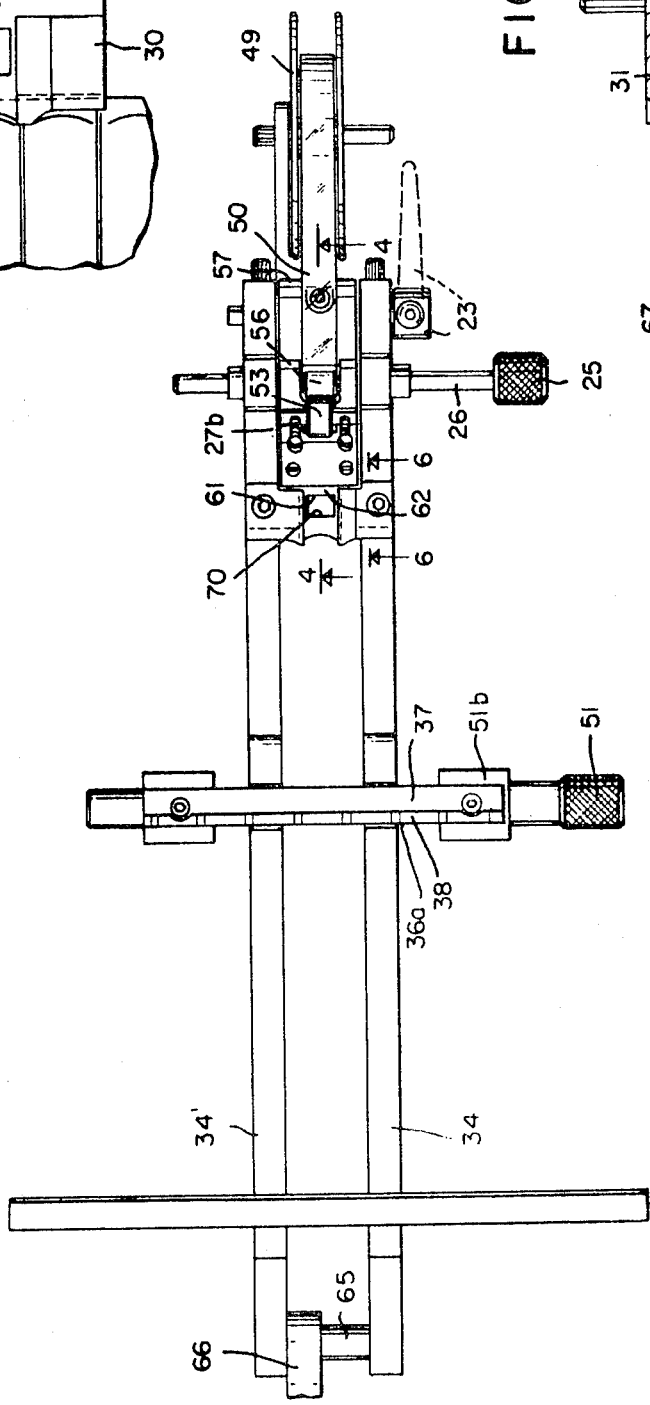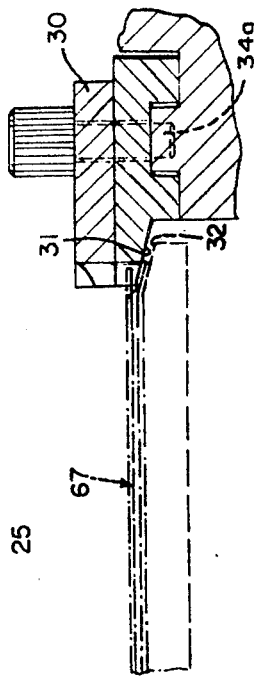

PROCESS AND DEVICE FOR VIEWING ADJACENT MICROFILM FRAMES IN SERIES

This invention concerns a novel process and a novel device for the introduction or insertion of microfilm into microfilm jackets, and is a continuation-in-part of parent application U.S. Ser. No. 611,004 filed Sept. 8, 1975, issued Oct. 25, 1977 as U.S. Pat. No. 4,003,187, and of its divisionals U.S. Ser. No. 845,482 (now U.S. Pat. No. 4,123,891) and U.S. Ser. No. 845,483 (now U.S. Pat. No. 4,173,837), both divisionals filed on May 13, 1976.

BACKGROUND TO THE INVENTION

It is known that there are no known mechanical devices that permit the precise and rapid severing of microfilm strip fragments of several frames from a longer strip, and insertion of severed microfilm strips into microfilm jackets in a satisfactory way.

The microfilm strips or microfilm frames are for the most part inserted by means of a time-consuming manual process into the individual sections of the microfilm jacket.

SUMMARY OF THE INVENTION

The basic object of the invention was therefore to develop a novel device for the introduction or insertion of microfilm strips and/or microfilm frames into microfilm jackets, and for simultaneously the cutting of a microfilm strip.

A further basic object of the invention was to develop a device for the introduction and insertion of microfilm, and to simultaneously permit the transport, the cutting and the rendering viewable of the microfilm strip and/or the individual microfilm frames.

A basic object of the invention was also to provide the device suited for the transport, cutting, rendering viewable, and introduction or insertion with a microfilm jacket support and holder device, and also to permit a precise and rapid introduction and insertion of the microfilm strips or microfilm frames in a series into the jacket.

Finally, it was an object of the invention to construct the jacket support and holder device in such a way that a continuous resetting and exchange of the microfilm strips and microfilm frames in a series was made possible.

Pursuant to the invention, the objects were obtained by means of a microfilm introduction or insertion device, suited both for the insertion of microfilm strips and of microfilm frames. Simultaneously the device transports the microfilm frames or microfilm strips, cuts them, renders them viewable, introduces and inserts them into the microfilm jacket continuously or intermittently. As well, the device is used for transferring the microfilm strips or microfilm frames that have already been inserted in the first microfilm jacket into a second microfilm jacket.

The novel microfilm introduction and insertion device is characterized mainly by the fact that the microfilm insertion opening of the microfilm jacket is located in the microfilm jacket holding tray, at the edge or rim; also a mechanism presses down upon the upper edge, which mechanism flexes the front lip downwardly. The lip extends beyond the jacket-support or holder near the microfilm-insertion opening. The feeding device aligns the longitudinal axis of the microfilm (a) with the longitudinal axis of the microfilm jacket and (b) with the longitudinal axis of the microfilm-support holding tray on which the microfilm jacket is mounted. The device which moves the microfilm forwardly continuously or intermittently and introduces it into the insertion opening of the microfilm jacket.

A microfilm projection device serves to render viewable individual sections of the microfilm and/or individual microfilm frames; at the same time, by means of a dual projection device the microfilm strips and/or the microfilm frames can be rendered viewable both before and after cutting.

Generally speaking, the invention concerns a microfilm jacket introduction or insertion device, consisting of a microfilm-support and holding device. It holds the microfilm jacket in a predetermined desired position (in a holding tray) such that a particular edge portion of the holding tray support structure is located above the introduction or insertion opening at the front edge of the microfilm jacket; this particular edge portion extends beyond a lower surface point for downward flexing of a leading lower lip of the microfilm jacket. The device pursuant to the invention further includes a pressure-producing structure in the form of a device adapted to flex-downwardly the leading lower lip of the microfilm jacket. Thereby it is possible to flex-downwardly the unsupported part of the leading lip of the microfilm jacket, downwardly as pressure is exerted on the upper surface of the microfilm jacket's leading lower lip. This device operates in such a way that the opening of the section of the microfilm jacket is opened relatively wide, so that the end of a microfilm can be easily inserted.

Various preferred embodiments of the device pursuant to the invention possess in combination elements of an insertion device to introduce the microfilms to be inserted or the microfilm frames to be inserted, while the longitudinal axis of the insertion device is arranged linearly with the longitudinal axis of the section of the microfilm jacket into which the microfilm is to be inserted. In addition, a cutting device is provided, in order to cut the individual frames from the microfilm, while the frames are located in the insertion device or near it. Furthermore, in the device pursuant to the invention, an advancing device is provided. A conventional image projection device or two or more image projection devices, is/are provided at a point near the introduction or insertion point. Thereby the microfilm to be inserted or the microfilm frames to be inserted can be rendered viewable, whereby the operators can determine which part of the microfilm or of the microfilm frame begins at one point and ends at another point, before the next section must be advanced and determined.

In a preferred embodiment, two image projection devices are provided, which make it possible to observe both the part of the microfilm located in front of the cutting device and the part that is behind the cutting device.

The present device pursuant to the invention makes it possible, in an efficient and rapid manner, to view or observe the individual frames of the microfilm or the microfilm strip at the point of insertion into the section of the microfilm jacket at the time of the separation by cutting.

In a further improved and preferred embodiment of the device pursuant to the invention, a feeding roll device and a novel microfilm jacket holder arranged in series are provided, in which the microfilm jackets are set continuously end to end in series along their longitudinal axes, as a continuous microfilm jacket-tape or band or envelope, with intermittent insertion openings. Furthermore, it is preferable that a pickup roll also be provided so that the microfilm jacket-band is not separated at any time but may as in the nature of a computer reel be wound-up as, or later wound-off as a further storage roll. The devices for holding and carrying the microfilm jackets can, if necessary, also be arranged in parallel. The sections of the microfilm jacket may be of varying widths; this is true whether they are arranged in series or in parallel.

Preferred embodiments of the device of the invention are explained in detail in the following detailed description, with reference to the following Figures.

THE FIGURES

FIGS. 2 and 3 show in in-part views, a preferred embodiment of the invention, in side views, in which two jacket-support and holding devices are arranged behind one-another in series; in FIG. 2, the transfer mechanism is shown enlarged and in cross-section.

FIG. 4 shows a top plan view of the embodiment of FIG. 1.

FIG. 5 shows a lateral cross-section taken along line 7—7 of FIG. 4.

FIG. 7 shows a schematic view of the device of FIG. 1, without the microfilm container carrier and holding devices.

FIG. 8 is a partial view of the transfer area from the introduction and insertion device to the jacket-support carrier and holding device with the microfilm jacket supported thereon.

FIG. 9 shows a lateral cross-section taken along line 6—6 of FIG. 7.

DETAILED DESCRIPTION OF THE INVENTION

Figure 1:
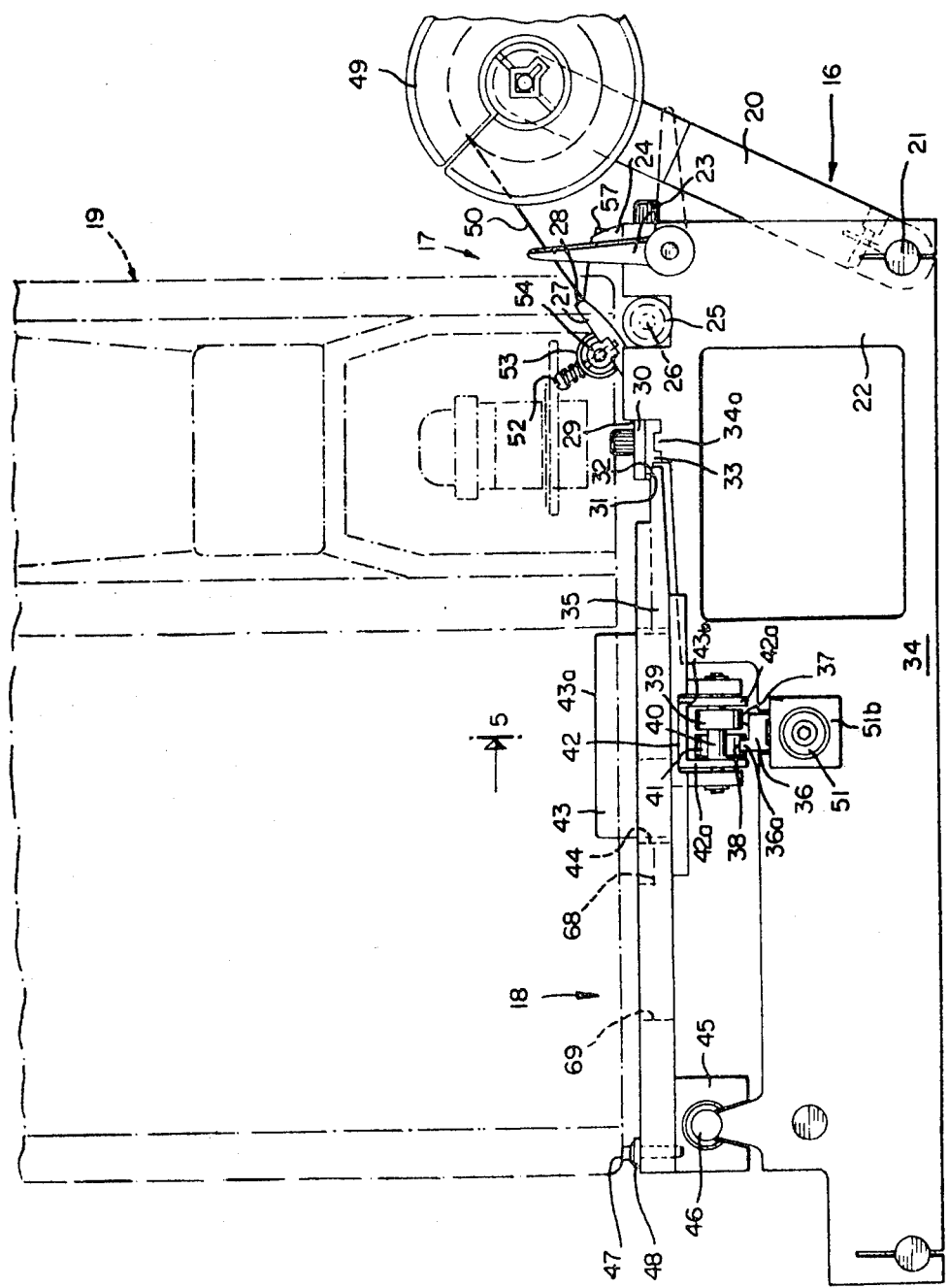
FIG. 1 shows a side view of a preferred embodiment of the device of the invention, with the image projection device presented schematically.
Figure 6:
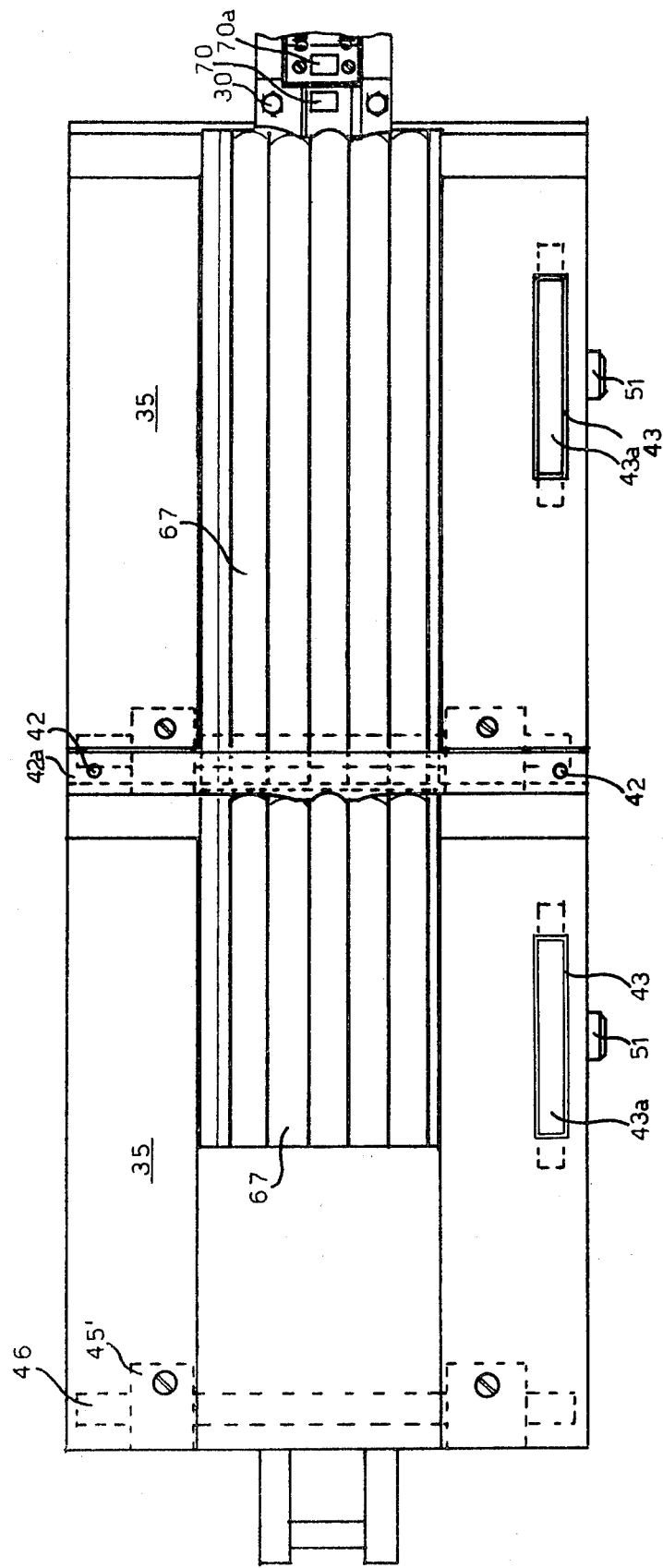
FIG. 6 shows a top plan view of the embodiment of the device of FIG. 3, with two jacket-support and holding devices linked to one-another, in series.

In FIG. 1, a device pursuant to the invention is presented, consisting of a feeding device 16 with a cutting device 17 and a support and holding device 18. On the feeding and cutting device the microfilm projection device 19 is mounted, in order to project a viewable image. A microfilm carrying lever 20 is fastened by means of the shaft 21 to the base 22. The feeding and cutting device assembly 24 can be moved with a lever 23. Lever 25, which is generally in the form of a knob, is used in order to move to or fro the microfilm forwardly or advance it or alternately retract it. Into it the axle 26 is rotated, in which likewise the feeding and cutting device is mounted with freedom to rotate. The channel-structure 27 forms a channel through which microfilm 50 is channeled beneath wheel 53 into opening 59 beneath plate 27'. At location 29 there is an exit opening 61 out of which the microfilm 50 is pushed forwardly from beneath plate 27' into and through space located between the spaced-apart portions of guide and lip structures 30. At that location within that space, the microfilm 50 is inserted into an open slit insert-opening of a microfilm jacket 67, which slit has been caused to open to become an insert-opening by the functioning mechanism of an insertion device. The insertion device includes a projection having a lower surface 31; an upper surface 32 of a pivoting end of the platform 35 presses upwardly against the lower surface 31, by which mechanism an intermediate lip of the microfilm jacket 67 is held in a downwardly-flexed position as illustrated in FIG. 9, thereby resulting in the opening of the slit to become an insert-opening. The upper surface 32, as seen in FIG. 9, is inclined downwardly. The key 34a coordinates with key 33 and thereby provides for exact alignment of the microfilm 50 (to be inserted) with the above-noted open slit insert-opening of the microfilm jacket 67, providing for needed adjustments.

Upper surface 32 is a forward end edge of the platform 35. The microfilm jacket support platform 35 is mounted pivotally with freedom to rotate on a pivoting lever 46 by means of the pivotably-mounted member 45, and is fastened by a releasable locking bolt 51 in FIG. 12, held by spring 51a. The holding platform 35 can be moved laterally and snapped into alternate positions provided along the entire length of platform 35, which corresponds to a width direction of the platform 35. The alternate positions are provided for by the scalloped member 36 having a series of consecutive separate slots 38 along an upper surface 37 of the extended portion 36a of the scalloped member 36. The platform 35 mounts a roller which moves from one to another alternate slot, as roller 41 mounted between flanges 42a and 42b on axle 40. See FIGS. 7 and 12.

In the FIGS. 2 and 3, the embodiment of the device of the invention is presented in which two consecutive holding platforms are linked behind one another, in series. A more rapid and accurate transfer of the microfilm strip or the microfilm frame from the first microfilm jacket into the microfilm jacket attached behind is ensured by operating in conjunction with rail structure 42.

Figure 12:
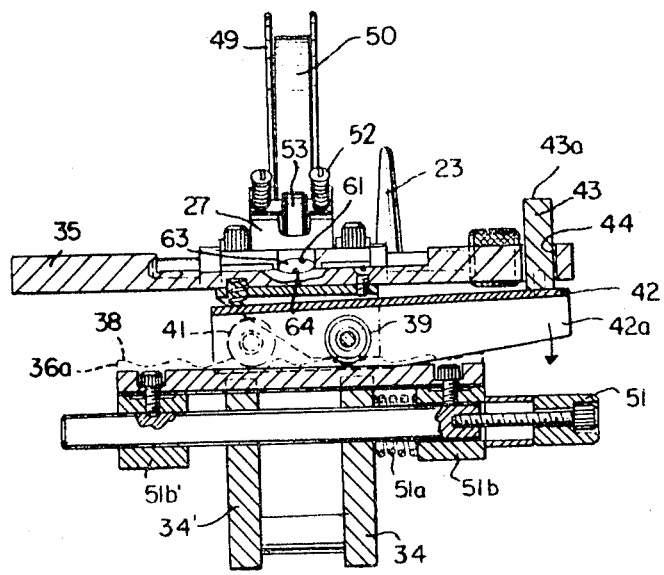
FIG. 12 shows a cross section taken along line 5—5 of FIG. 1.
Figure 13:
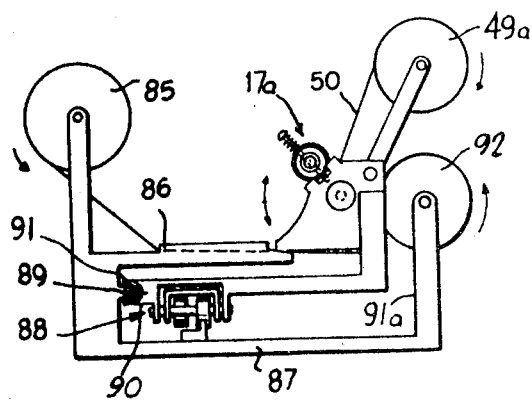
FIG. 13 shows a side view of an alternative embodiment of the invention.

It is apparent from FIGS. 1 through 9 that the lower surface 43b between the flanges extends downwardly, against which the upper surface 43b of rail structure 42 is normally pressed, when it is bolted, by virtue of the spring action, as may be seen from FIG. 12. A sliding knob 43 is pressed downwardly on rail structure 42 and extends upwardly through the open space 44 into the platform 35. The platform 35 is locked into pivotably-mounted member 45 by means of a suitable metal strip 48 and a locking bolt 47. The roller 49 acts as a guide roller to conduct the band 50 beneath wheel 53 into the opening 59 which is formed beneath plate 27'. The locking structure 41b provides, by means of the lever or the knob 51, for an axial insertion along the longitudinal axis of the scalloped member 36, that is, to the extent that one support and holding structure is arranged laterally in line with the other. Thus, it is possible to align the end part 32 in such a manner that the corresponding microfilm jacket section receives the microfilm in the exact position in front of the exit opening 29—i.e. the rear input opening or rear opening, where the section is defined near the guide and lip structures 30. A screw or bolt 52, provided with a spring, extends through the shaft or rod 54, in which the wheel 53 is mounted with freedom to rotate. The shaft 54 is attached by means of the spring to the bolt 52 in free contact and rotationally movable with a wheel which is mounted on the shaft 26. This wheel is mounted firmly on it in order to rotate about the shaft when the latter is rotated. These features may be seen in FIG. 15, in which the surface of the wheel 53 engages surface 56 of wheel 55, which is mounted on the shaft. An adjusting screw or bolt 93 determines the position at which the rotating channel structure 27 is normally positioned with openings, in order to introduce the microfilm in a suitable manner. The screw 57 has a shaft 57a which extends through the rotating channel structure 27 and rests against support base structure 22a.

Figure 15:
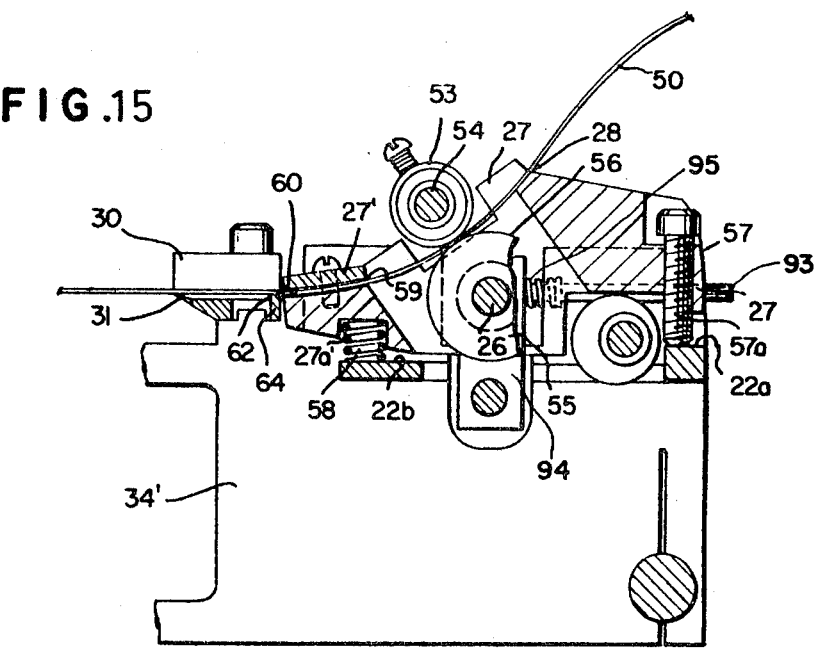
FIG. 15 shows a lateral partial cross-section through the advance projection device of the invention.

FIG. 15 shows how the spring 58 presses the rotating channel structure 27 upwardly into a stable position. Opening 59 for channel 60 has a film-exit structure 63 defining an exit opening 61. At this exit opening 61, the film 50 is introduced into the concave channel or section seat 62, which is located between the spaced-apart portions of the guide and lip structure 30. This may be seen, for example, from FIG. 5. Channel structure 64 forms a passage channel or passage section 70, through which the microfilm can be conducted and through which a light can be directed from below upwardly by means of a lens system, in order to obtain the corresponding image, with the aid of a microfilm projection device, as shown in FIG. 1.

Figure 14:
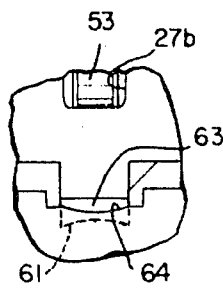
FIG. 14 shows a partial enlargement of the view of FIG. 12.

In FIGS. 12 and 14, the channel or section positions and the film-exit structure 63 are shown in open position. FIG. 14 shows how the cutting lever can be turned clockwise around the pivot in order to move the film exit structure 63 downwardly. As a result, by means of the upwardly-turned concave opening, the cut-out seat 43 is cut-through the platform 35. The separated film is pressed further into the microfilm jacket section, into which the cut-off film is shoved forwardly. The spring 95 on knob 93 exerts pressure on the rotating channel structure 27 and the pivotably-mounted leg 94. FIG. 4 shows how a connecting rod 65 is mounted between flanges 34 and 34' in order to mount a further suitable mechanism, as shown in FIG. 7, for example. In this mechanism a part 66 is mounted to it by means of the shaft 65 and extends through the opening into the latter.

FIGS. 1 through 14 show how the roller 83 is attached to the rod 84 with the microfilm feeding wheel 85 and how the microfilm jacket is introduced by the guide 86, the guid 86 being a stationary guid on the base 87. The base 87 is equipped with a position selector 88, which moves along the selector device 89 as a part of the arm structure 90 that can be moved laterally back and forth to and fro. Structure 90 is supported by the rod 91 on the base 87. The carrying structure 91a, receives the microfilm jacket, from a roll mounted on the wheel 92, while the microfilm is introduced from the microfilm feeding wheel 49 into the cutting device 17a.

FIGS. 1 through 13 show how the insertion and cutting mechanism, which is free to move sideways to and fro back and forth, in order to select the desired microfilm jacket section, can be improved in its mode of operation by means of the wheel 92.

Figure 10:
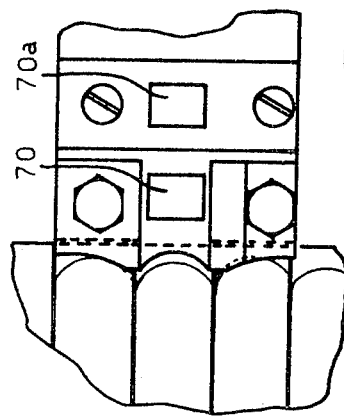
FIG. 10 shows the transfer area of the embodiment of FIG. 6, with two openings for the image projection device.
Figure 11:
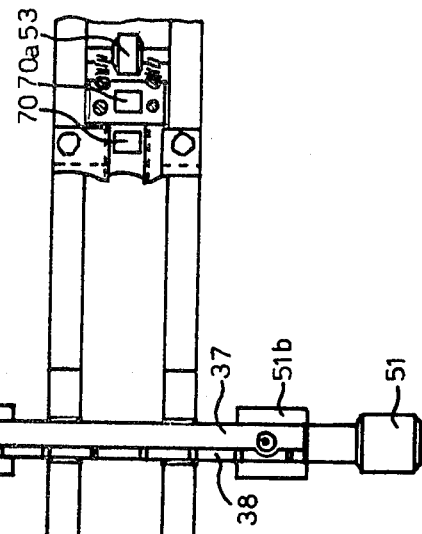
FIG. 11 shows the preferred embodiment of FIG. 6, with the jacket-support and holding devices removed.
Figure 16:
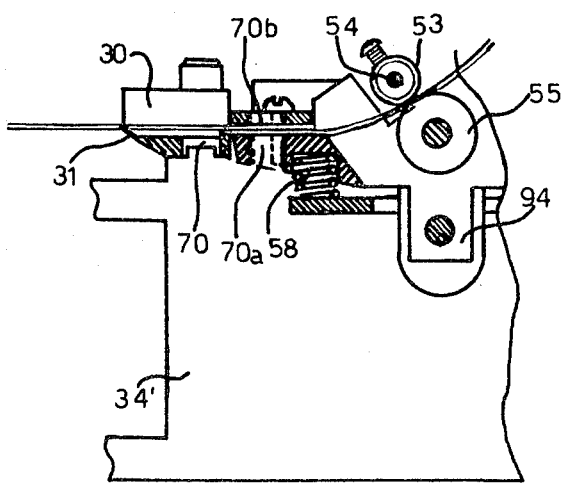
FIG. 16 is an in-part view as a lateral partial cross-sectional view through a special embodiment of the advance and image projection device pursuant to the invention, in which two openings for the image projection devices are provided.

In the FIGS. 10, 11, and 16, a preferred embodiment is shown, in which, by means of apertures 70 and 70a, the microfilm or microfilm frames being passed through can be rendered viewable by means of two image projection devices, both before and after the cutting location.

The mode of operation of the device shown in FIGS. 1 through 16 pursuant to the invention, is extremely simple and effective. The microfilm 50 is moved by means of the knob 25 which moves the shaft 26, so that the microfilm 50 is moved out by means of the elements 55, 56, and 53 into the opening 59 and then out of the opening 61 onto the lower concave seating surface 62. The cutting device 63 cuts the microfilm in a downward motion if the channel structure 27 is moved by means of cutting lever 23, upon which the edge of the surface 62 moves against the cutting surface. As a result, the film strip is cut through, if the cutting device 61, as shown in FIG. 14, is moved. By means of the cutting and advancing mechanism, the film is conveyed and stopped and brought into a suitable cutting position. Then the lever 25 is turned further and shoves the microfilm under the lip 73. Next the lever 25 is moved back in a counterclockwise direction, in order to have the remaining microfilm strips that have not been cut moved back and again made visible, by means of the image projection device using the light ray passing through opening 70 or 77a as the case may be.

It is within the scope and spirit of the invention to make such variations and modifications and substitution of equivalents as might be apparent to a person of ordinary skill in this art.

I claim:

1. A microfilm strip viewing and inserting device comprising in combination at least first and second image projection means mounted in juxta-position and in series with one another for providing a film strip guide path, and for positioning in simultaneously viewable states at least a first frame of consecutive adjacent frames of a microfilm strip through said first image projection means, and the next adjacent consecutive frame through said second projection means, said first and second image projection means positioned to project spaced apart adjacent images, said device further including microfilm insertion means for insertion of severed microfilm strip into a microfilm jacket, said microfilm insertion means being adapted to impel a second frame of severed microfilm strip from a position viewable by the second image projection means position into an insert opening of a microfilm jacket.

2. The microfilm strip viewing and inserting device of claim 1, including microfilm jacket support means positioned in juxtaposition to and in series with said microfilm insertion means, for supporting a microfilm jacket in a microfilm strip-receiving position for insertion of the second frame of severed microfilm strip into a microfilm jacket when supported by said support means.

* * * * *